United States Patent [19]

Pittet et al.

[11] E Re. 30,370

[45] Reissued Aug. 12, 1980

[54] FLAVORING FOODSTUFFS WITH A THIOESTER

[75] Inventors: Alan O. Pittet, Atlantic Highlands; Denis E. Hruza, Bricktown; Ira Katz, Elberon; Cynthia J. Mussinan, Bricktown; John V. Pascale, Jackson, all of N.J.

[73] Assignee: International Flavors & Fragrances Inc., New York, N.Y.

[21] Appl. No.: 3,882

[22] Filed: Jan. 16, 1979

Related U.S. Patent Documents

Reissue of:

[64] Patent No.: 3,879,562
Issued: Apr. 22, 1975
Appl. No.: 314,381
Filed: Dec. 12, 1972

U.S. Applications:

[62] Division of Ser. No. 195,829, Nov. 4, 1971, abandoned.

[51] Int. Cl.[2] ..... A23L 1/226

[52] U.S. Cl. ..... 426/535

[58] Field of Search ..... 426/535

[56] References Cited

U.S. PATENT DOCUMENTS

| | | | |
|---|---|---|---|
| 2,259,869 | 10/1941 | Allen | 260/455 R |
| 3,028,417 | 4/1962 | Eisenmann | 260/455 R |
| 3,346,611 | 10/1967 | Doss | 260/455 |
| 3,773,524 | 11/1973 | Katz et al. | 426/535 |
| 3,879,562 | 4/1975 | Pittet et al. | 426/535 |

OTHER PUBLICATIONS

The British Food Manufacturing Industries Research Association, 11/25/64, Synthetic Flavouring Substances and Adjuvants in the U.S.A. Reprinting from the Federal Register of May 27, 1946.

*Primary Examiner*—Joseph M. Golian
*Attorney, Agent, or Firm*—Arthur L. Liberman

[57] ABSTRACT

Processes for imparting flavors and aromas to consumable materials, for example vegetable flavors to foodstuffs or perique flavors to tobacco, by adding to such materials a small amount of at least one thioester according to the formula:

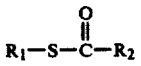

wherein $R_1$ is alkyl, aryl, aralkyl, alkaryl, cycloalkyl, or alkenyl and $R_2$ is alkyl, alkylthioalkyl, aralkyl, alkaryl, or aryl, $R_1$ containing at least two carbon atoms when $R_2$ is an alkyl group containing three or four carbon atoms, effective to alter the flavor and/or aroma of such materials, together with compositions containing such thioesters and adapted to alter the flavor and/or aroma of such materials, novel cycloalkyl and alkenyl thiopropionates useful for such purposes, and processes for producing such novel thiopropionates.

7 Claims, No Drawings

FLAVORING FOODSTUFFS WITH A THIOESTER

Matter enclosed in heavy brackets [ ] appears in the original patent but forms no part of this reissue specification; matter printed in italics indicates the additions made by reissue.

This application is a division of application Ser. No. 195,829, filed on Nov. 4, 1971, now abandoned.

BACKGROUND OF THE INVENTION

The present invention relates to novel methods and compositions utilizing certain thioesters, a number of which are novel themselves, to alter the flavor and/or aroma of consumable materials.

There has been considerable work on substances which can be used to impart flavors to various consumable materials. These substances are used to diminish dependence on natural materials, some of which may be in short supply, and to provide more uniform properties in the finished product. Vegetable flavors, and particularly alliaceous vegetable flavors, are particularly desirable for many uses in consumable articles.

Furfuryl thioesters have been suggested in United Kingdom Pat. No. 1,156,480 for possible use in coffee flavors. Ethyl-α-methyldithiopropionate and ethyl-α-methyldithioisobutyrate have been said to possess green or onion-like fragrance notes, and methanethiol benzoate, methanethiol isovalerate, methanethiol anteisovalerate, methanethiol butyrate, and methanethiol valerate have been said to have milky, rotten egg, cheese or gaseous, cabbage odor-flavor contributions in Netherlands Patent Application No. 68/12,899.

McFadden, et al., Analytical Chemistry 37,560, have suggested the presence of methyl thiohexanoate and thioheptanoate in oil derived from hops, and Buttery, et al., have reported similar work in J. Chromatography 18,399. See also Schultz, Day, and Libbey, The Chemistry and Physiology of Flavors, Westport, Conn.: Avi. 1967, especially at page 412. S-Alkyl derivatives of thioacetic, thioacrylic, and thiobutyric acids have been prepared and are described as disagreeable-smelling liquids. Boehme, et al., Annalen, 648, 15 describes vinyl thioacetate as ill-smelling.

Showell, et al., J. Org. Chem., 27, 2853–8 (1962) show syntheses of cyclohexyl and cyclopentyl thioacetates but do not indicate flavor utility or properties.

Schleppnik and Zenty, J. Org. Chem. 29, 1910–15 (1964) demonstrate syntheses of alkyl(3-alkylthio)thiopropionates via 3-alkylthioacyl chloride intermediates. Synthesis of methyl(3-methylthio)thiopropionate is set out in U.S. Pat. No. 2,888,480. Thioesters are shown in U.S. Pat. Nos. 2,550,141; 2,259,869; and 3,369,979. U.S. Pat. No. 3,103,464 shows various thioesters, including allyl thioacetate, butenyl thioacetate, cyclohexyl thioacetate, and butyl thiobenzoate.

THE INVENTION

It has now been discovered that certain alkyl, aryl, cycloalkyl, and alkenyl S-esters of thio acids can be used to impart good vegetable flavor character to foodstuffs, and they can also be used to provide pleasant notes such as perique-like flavor notes in tobacco products. More specifically, small amounts of thioesters having the formula:

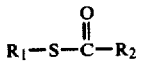

wherein $R_1$ is alkyl, cycloalkyl, aryl, aralkyl, alkaryl, or alkenyl, $R_2$ is alkyl, alkyl thioalkyl, aralkyl, alkaryl, or aryl, $R_1$ containing at least two carbon atoms when $R_2$ is an alkyl group having three or four carbon atoms or phenyl, are used according to this invention to alter the flavor and/or aroma of consumable materials. It is further contemplated according to the present invention that compositions containing effective amounts of such thioesters also be used for altering flavors and aromas.

Two of the compounds contemplated herein are novel. The novel compounds are an alkenyl thioester, allyl thiopropionate, and a cycloalkyl thioester, cyclopentyl thiopropionate, both of which can be represented by the generic formula:

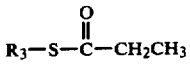

wherein $R_3$ is cyclopentyl or allyl.

Thioesters useful in the instant invention, including the novel thioesters can be prepared according to the method of Wenzel and Reid, J. Am. Chem. Soc. 59, 1089 (1937) by reaction of an acyl halide and the appropriate mercaptan. Thus, allyl thiopropionate is produced by intimately admixing propionyl chloride and allyl mercaptan at a temperature in the range of −10° to +40° C. at atmospheric pressure. Similarly, cyclopentyl thiopropionate is produced by intimately admixing cyclopentane thiol and propionyl chloride at a temperature in the range of −10° to +40° C.

The alkyl 3-(alkylthio)thio acid esters are desirably produced by admixing acroyl chloride and alkyl mercaptan at a temperature in the range of −10° to +40° C. Thus, acroyl chloride and methyl mercaptan are reacted to provide methyl3-(methylthio)thiopropionate. In the same manner ethyl (3-ethylthio)thiopropionate is produced from acroyl chloride and ethyl mercaptan; propyl(3-propylthio)thiopropionate, from acroyl chloride and propyl mercaptan, and so on. Methyl 3-(ethylthio)thiopropionate and ethyl 3-(methylthio)thiopropionate are produced in admixture using acroyl chloride and mixtures of methyl mercaptan and ethyl mercaptan in various proportions, depending upon the proportions of methyl 3-(ethylthio)thiopropionate to ethyl 3-(methylthio)thiopropionate desired in the final reaction product. If desired the various compounds produced in the reaction product can be separated to provide a. methyl 3-(ethylthio)thiopropionate
b. ethyl 3-(methylthio)thiopropionate
c. methyl 3-(methylthio)thiopropionate
d. ethyl 3(ethylthio)thiopropionate The reaction is broadly described in two steps as follows:

Step 1

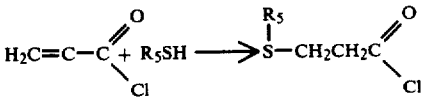

Step 2

-continued

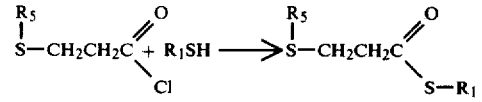

It will be noted than an intermediate alkylthioacyl halide is first formed by reaction of one mole of mercaptan with one mole of acroyl halide. On addition of an additional mole of mercaptan the alkylthioacyl halide intermediate is converted into the desired alkyl 3-(alkylthio)-thiopropionate. $R_5$ represents a lower alkyl group, preferably one having from one to three carbon atoms. The above alkyl acyl halides used herein have the generic formula:

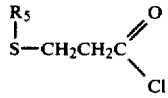

wherein it will be understood that only a single alkyl group is referred to because of considering only a single molecule at a time. If mixed mercaptans are used, the alkyl groups resulting in the finished products will also be mixed. $R_1$ has the meaning as set forth herein above.

The reaction is carried out at atmospheric or superatmospheric pressures. Atmospheric pressures are preferred, except in the case of highly volatile reactants or where the temperature of reaction is maintained greater than 10° C., in which case superatmospheric pressures are preferred. Except in the case when alkyl 3-(alkylthio)thiopropionates are produced, the mole ratio of acyl halide to mercaptan is in the range of about 0.5:1 to about 1:1 with a 1:1 mole ratio preferred. If lower mole ratios are used, excess mercaptan must be removed at the end of the reaction (via distillation or other appropriate techniques). Where alkyl 3-(alkylthio)thiopropionates are produced, the mole ratio of acyl halide to mercaptan is in the range of about 0.25:1 to about 0.5:1, with the 0.5:1 mole ratio preferred. Higher mole ratios can produce an excess of alkylthioacyl halide intermediate which is difficult to recycle.

The presence of a reaction vehicle is not necessary but the reaction can take place in a non-reactive volatile vehicle, preferably a solvent such as diethyl ether or cyclohexane. The advantage of using such a vehicle is that better control of the reaction is achieved. This is particularly advantageous when carrying out the reaction on an industrial scale. In the alternative, excess mercaptan can be used as a reaction solvent, but use of higher molecular weight mercaptans can give rise to difficulties in purifying the reaction product.

After the reaction is terminated the reaction mass is "worked up" using the conventional extraction and distillation procedures, such as those described by Wenzel and Reid or McFadden, et al., mentioned above.

As used herein, consumable material includes foodstuffs, flavoring compositions, tobacco and tobacco products, and the like in which the aroma and/or flavor is altered. It will thus be understood that compounds according to this invention can be utilized to alter the flavor and/or aroma of a wide variety of materials which are ingested or otherwise consumed.

In the present invention, useful materials are those wherein the alkyl, aryl, aralkyl, cycloalkyl, and alkenyl groups represented by $R_1$ are desirably groups containing from 1 to 10 carbon atoms. The alkyl and alkenyl groups can be straight-chain or branched-chain. The aryl groups contain 6 to 10 carbon atoms and aralkyl groups contain 7 to 10 carbon atoms. The cycloalkyl groups can be mono- or polyalkyl-substituted. Thus, preferred, alkyl, aryl, aralkyl, cycloalkyl and alkenyl groups according to the present invention include methyl, ethyl, n-propyl, isoproypl, n-butyl, i-butyl, amyl, heptyl, phenyl, tolyl, xylyl, phenylmethyl, phenylethyl, phenylpropyl, tolylpropyl, cyclopentyl, cyclohexyl, and allyl. In certain preferred embodiments of this invention, $R_1$ represents methyl, ethyl, propyl, allyl, or cyclopentyl.

The alkyl groups represented by $R_2$ contain from 1 to 10 carbon atoms and they desirably contain from 1 to 3 carbon atoms. Thus, preferred alkyl groups include methyl, ethyl and propyl. The alkylthioalkyl groups represented by $R_2$ contain 2 to 6 carbon atoms and a preferred alkylthioalkyl group is methylthioethyl. The aryl groups encompassed by $R_2$ include substituted and unsubstituted mono- and polynuclear aryl groups. A particularly preferred aryl is phenyl. The aralkyl groups encompassed by $R_2$ include phenylmethyl and phenylethyl. In certain preferred embodiments, $R_2$ represents methyl, ethyl, propyl, and phenyl. It will be understood that when $R_2$ is phenyl or an alkyl group containing three or four carbon atoms, $R_1$ contains at least two carbon atoms.

The thioesters used according to the present invention are, in many instances, commercially available from various suppliers, although as stated above certain materials used herein are novel. Regardless of the source of the thioester or thioesters, these substances should be free from any deleterious impurities which affect their suitability for use in flavors. In many instances, it is desirable to have the thioesters be at least 95 percent pure.

Cyclopentyl thiopropionate has a characteristic taste of fresh onion at 0.5 to 2 ppm (parts per million). At 5 ppm, fruity notes are added to this character with a lingering onion aftertaste, such as is noted when fresh onions are eaten. This compound is very interesting for use in onion flavors, and has a threshold level of about 0.2 ppm. It can be used at levels on the order of 4 ppm. All parts, percentages, proportions, and ratios herein are by weight, unless otherwise, indicated.

Propyl thioacetate has a sharp, fresh onion odor with a burning aroma characteristic. When tasted in aqueous solution at 0.1 to 5.0 ppm, it has a fresh onion flavor with a lingering onion aftertaste.

Allyl thiopropionate has a very characteristic fresh garlic odor in aqueous solution at 0.02 to 0.5 ppm. At 10 ppm aqueous solution has a cooked garlic flavor with a light metallic and burning aftertaste.

Methyl thiopropionate has a cooked cabbage-broccoli odor at 0.1 to 5 ppm. A 10 ppm aqueous solution has a cooked brussel sprouts/broccoli flavor with a light bitter after-taste. At higher use levels, it has a fruit-like flavor.

n-Propyl thiopropionate has an odor of freshly sliced onions in aqueous solution at 1 ppm. Aqueous solutions containing from 0.01 to 2.2 ppm have a taste like fresh onion juice with a long-lingering aftertaste. It also lends a pleasant note to burning tobacco at levels of 5–15 ppm.

Methyl thioacetate in ethanolic solution at 0.01 ppm has a sweet, nut-like creamy taste. At 0.1 ppm it has a popcorn-cereal taste, while at one ppm a cabbage, vegetable aroma and taste are dominant. This material is suitable for milk, bread, and popcorn flavors at low levels and can be used at higher levels for vegetable, especially cabbage, flavors. Its threshold level is about 0.005 ppm.

Ethyl thioacetate has an odor in alcoholic solution at levels of 0.01 to one percent like meat extract. In water at 0.05 ppm, near the threshold level, it has an aroma reminiscent of meat extract and hydrolyzed vegetable protein, and a taste which is slightly sweet and characteristic of beef extract. Similarly, at 0.1 ppm it has a characteristic aroma and taste of beef extract. In chicken soup, it deepens the taste at 0.01 ppm, and at 0.2 ppm it increases the meat flavor notes and enhances the flavor, much along the lines of monosodium glutamate. At 0.5 ppm it introduces beef flavor notes with a very pleasant, full meat aftertaste in chicken soup. It also has vegetable flavor notes.

Alkyl thiobenzoate has a very characteristic garlic salami aroma in aqueous solution at 0.02 up to 0.5 ppm. At 10 ppm the aqueous solution has a fruity onion aroma with a bitter note.

Propyl thiobenzoate has an onion aroma and a fruit-/onion taste at 0.02–0.2 ppm. At 10 ppm it has a sweet fruity taste with an onion backnote.

Methyl 3-(methylthio)thiopropionate has a cabbage/-cauliflower-like aroma and taste and in addition a bready yeasty character from 0.2 up to 1 ppm. At 10 ppm it has a lingering metallic green note. Its use level is from 0.2 up to 1 ppm.

Methyl thiobenzoate has been found to lend a perique tobacco note to tobacco at levels of 5–15 ppm.

It will be appreciated from the present disclosure that the thioesters can be used to alter, vary, fortify, modify, enhance, or otherwise improve the flavor or aroma of a wide variety of materials which are ingested, consumed, or otherwise organoleptically sensed.

The term "alter" in its various forms will be understood herein to mean the supplying or imparting a flavor character or note to an otherwise bland, relatively tasteless substance, or augmenting an existing flavor characteristic where the natural flavor is deficient in some regard, or supplementing the existing flavor impression to modify organoleptic character.

The thioesters and mixtures thereof are accordingly useful in flavoring compositions. A flavoring composition is taken to mean one which contributes a part of the overall flavor impression by supplementing or fortifying a natural or artificial flavor in a material as well as one which supplies substantially all the flavor and/or aroma character to a consumable article.

The term "foodstuff" as used herein includes both solid and liquid ingestible materials for man or animal, which materials usually do, but need not, have nutritional value. Thus, foodstuffs include meats, gravies, soups, convenience foods, malt, alcoholic, and other beverages, milk and dairy products, seafoods including fish, crustaceans, mollusks, and the like, candies, vegetables, cereals, soft drinks, snacks, dog and cat foods, other veterinary products, and the like. It will be understood by those skilled in the art that the thioesters can be used to impart vegetable, meat, and other flavor notes to foodstuffs as aforementioned whenever such notes are desired.

When the thioesters of this invention are used in a flavoring composition, they can be combined with conventional flavoring materials or adjuvants. Such coingredients or flavoring adjuvants are well known in the art for such use and have been extensively described in the literature. Apart from the requirements that any such adjuvant material be ingestibly acceptable, and thus non-toxic or otherwise nondeleterious, conventional materials can be used and broadly include other flavor materials, vehicles, stabilizers, thickeners, surface active agents, conditioners and flavor intensifiers.

Such conventional flavoring materials include saturated, unsaturated, fatty and amino acids; alcohols, including primary and secondary alcohols; esters, carbonyl compounds including ketones and aldehydes; lactones; other cyclic organic materials including benzene derivatives, alicyclics, heterocyclics such as furans, pyridines, pyrazines and the like or derivatives thereof; other sulfur-containing materials including thiols, sulfides, disulfides and the like; proteins; hydrolyzed vegetable protein; lipids; carbohydrates; so-called flavor potentiators such as monosodium glutamate, guanylates, and inosinates; natural flavoring materials including natural onion oils and natural garlic oils; essential oils and extracts; artificial flavoring materials; and the like.

More particularly, vegetable-type flavoring compositions desirably contain, in addition to a thioester or thioesters, at least one of dipropyl disulfide, diallyl disulfide, propyl propenyl disulfide, 2-methoxy-3-isobutyl pyrazine and 2-isobutyl thiazole. Furthermore, the thioesters of this invention are useful in completing natural as well as synthetic onion and/or garlic oil formulations. Examples of such synthetic onion and garlic oil compositions which can be enhanced are those utilizing alkyl 1-alkenyl sulfides, as shown for instance in U.S. Pat. No. 3,615,601.

Stabilizers include preservatives such as sodium chloride, and the like, antioxidants such as calcium and sodium ascorbate, ascorbic acid, butylated hydroxyanisole, butylated hydroxytoluene, propyl gallate, and the like; sequestrants such as citric acid, ethylenediamine tetracetic acid, phosphates, and the like.

Thickeners include materials such as carriers, binders, protective colloids, suspending agents, emulsifiers and the like, such as agar-agar, carrageenan, cellulose and cellulose derivatives such as carboxymethyl cellulose and methyl cellulose, natural and synthetic gums such as gum arabic, gum tragacanth and the like, and other proteinaceous materials, lipids, carbohydrates, starches, and pectins.

Surface active agents includle emulsifying agents such as mono- and/or diglycerides of fatty acids such as capric acid, caprylic acid, palmitic acid, stearic acid, oleic acid, myristic acid, and the like; lecithin; defoaming and flavor-dispersing agents such as sorbitan monostearate, potassium stearate, hydrogenated tallow alcohol, and the like.

Conditioners include compounds such as bleaching and maturing agents such as benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents such as sodium acetate, ammonium bicarbonate, ammonium phosphate, citric acid, lactic acid, vinegar and the like; colorants such as carminic acid cochineal, turmeric, curcumin, and the like; firming agents such as aluminum sodium sulfate, calcium chloride and calcium gulconate; texturizers; anti-caking agents such as aluminum calcium sulfate and tribasic calcium phosphate; enzymes; yeast foods such as calcium lactate and calcium sulfate; nutrient supplements such as iron salts such as ferric phosphate, ferric pyrophosphate, ferrous gluconate and the like, riboflavin, vitamins, zinc sources such as zinc chloride, zinc sulfate, and the like.

The thioesters or mixtures thereof or the compositions incorporating them, as mentioned above, can be combined with one or more vehicles or carriers for adding them to the particular product. Vehicles can be edible or otherwise suitable materials such as ethyl alcohol, propylene glycol, water, and the like. Carriers include materials such as gum arabic, carrageenen, other gums, and the like. The thioester can be incorporated with the carriers by conventional means such as spray-drying, drum-drying, and the like. Such carriers can also include materials for coacervating the thioesters of the present invention (and other flavoring ingredients, as present) to provide encapsulated products. When the carrier is an emulsion, the flavoring composition can also contain emulsifiers such as mono- and diglycerides of fatty acids and the like. With these carriers or vehicles the desired physical form of the composition can be prepared.

It will be understood by those skilled in the art that the thioester or thioesters can be added to the materials to be flavored at any convenient point in the production of the finished product. Thus, when the thioester is used to alter or otherwise vary the flavor of a foodstuff, it can be added in the original mixture, dough, emulsion, batter, natural product, or the like prior to any cooking or heating operation. Alternatively, it can be added at a later stage of processing if volatilization losses would be excessive during the earlier processing. The quantity of thioester utilized should be sufficient to impart the desired vegetable flavor characteristic to the product, but on the other hand, the use of an excessive amount of such thioesters is not only wasteful and uneconomic, but too large a quantity unbalances the flavor of the product consumed. Moreover, at too high a level in flavoring compositions (and also in foodstuffs) the vegetable or other pleasant food character of the thioesters will be lost.

The quantity used will vary depending upon the ultimate foodstuff, or other consumable product; the amount and type of flavor initially present in the product; the further process or treatment steps to which the product will be subjected; regional and other preference factors; the type of storage, if any, to which the product will be subjected; and the pre-consumption treatment, such as baking, frying, and so on, given to the product by the ultimate consumer. Accordingly, the terminology "effective amount" and "sufficient amount" is understood in the context of the present invention to be quantitatively adequate to alter the flavor of the foodstuff, tobacco, or other consumable material.

Thioesters according to this invention can also be used to improve and augment the organoleptic properties of tobacco and tobacco products. Thus, for example, methyl thiobenzoate conveys a perique-type of note to tobacco. Tobacco, as used herein, includes natural tobaccos such as burley, Turkish tobacco, Maryland tobacco; tobacco-like products such as reconstituted tobacco or homogenized tobacco; and tobacco substitutes intended to replace natural tobacco such as various vegetable leaves, for example lettuce and cabbage leaves and the like.

When the thioesters are used to treat tobacco products, the additive can be applied in a suitable manner, as by spraying, dipping or otherwise. The thioesters or compositions containing them can be applied during the "casing" or final spray treatment of the tobacco, or they can be applied at some earlier stage of curing or preparation. The quantity of thioesters or mixtures thereof utilized should be sufficient to impart the desired flavor characteristic to the product; on the other hand, the use of an excessive amount of the thioesters is not only wasteful and uneconomic, as noted above, but in some instances too large a quantity may unbalance the flavor or other organoleptic property of the product consumed.

It is accordingly highly desirable that the ultimate compositions contain from about 0.005 to about 40 ppm of the thioester or thioesters. More particularly, in food compositions it is preferred to use from about 0.01 to about 10 ppm.

The amount of thioesters to be utilized in flavoring compositions can be varied over a wide range depending upon the particular quality to be added to the foodstuff or other consumable material. Thus, amounts of the thioester according to the present invention from about 0.1 percent up to 80 or 90 percent can be incorporated in such compositions. It is generally found to be desirable to include from about 0.5 to about 50 percent of thioester in such compositions.

The following examples are given to illustrate embodiments of the invention as it is presently preferred to practice it. It will be understood that these examples are illustrative, and the invention is not to be considered as restricted thereto except as indicated in the appended claims.

EXAMPLE I

Preparation of Allyl Thiopropionate

Propionyl chloride (45 g, 0.5 mole) is placed in a 250 ml flask equipped with a stirrer, addition funnel and thermometer, and is cooled to 5° C. Then, 37 g (0.5 mole) of allyl mercaptan is added dropwise over a 30-minute period while constantly stirring the reaction mixture and maintaining the temperature at 5° C. The reaction mixture is allowed to warm to room temperature and allowed to remain at room temperature for 2 days.

The reaction mixture is added to 500 ml distilled water and the mixture is transferred to a separatory funnel. The aqueous layer is separated and discarded and the organic layer, after drying over calcium chloride, is distilled under reduced pressure.

The product is obtained as a colorless liquid with b.p. 77° C. at 10 mm Hg. Yield 21.8 g of greater than 95 percent purity as shown by coupled gas chromatography/mass spectrometric analysis.

The allyl thiopropionate has the following mass fragmentation pattern, in order of decreasing ion abundance, m/e: 57, 29, 27, 39, 41. The information yielded by these data are consistent with the structure $$CH_2{=}CH{-}CH_2{-}S{-}\overset{\overset{\displaystyle O}{\|}}{C}{-}C_2H_5$$

EXAMPLE II

Preparation of Cyclopentyl Thiopropionate

Propionyl chloride (18.4 g, 0.2 mole) is placed in a 250 ml flask equipped with stirrer, additional funnel and thermometer, and is cooled to 5° C. Then, 20.4 g (0.2 mole) cyclopentanethiol is added dropwise over a 30-minute period while constantly stirring the reaction mixture and maintaining the temperature at 5° C. The reaction mixture is allowed to warm to room temperature and is allowed to stand at room temperature for 3 days.

The reaction mixture is added to 150 ml water and the organic layer is collected. After drying over calcium chloride the product is distilled under reduced pressure to yield pure cylcopentyl thiopropionate (15.7 g) with b.p. 95° C. at 20 mm Hg.

The product shows the following mass fragmentation pattern, in order of decreasing abundance, m/e: 57, 29, 41, 158, 27, 91.

The foregoing data are consistent with the structure

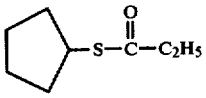

EXAMPLE III

The following mixture is prepared:

| Ingredient | Parts |
|---|---|
| Allyl thiopropionate | 30 |
| Natural garlic oil | 70 |

The mixture is compared with the pure natural garlic oil at the level of 0.5 ppm in water. The above mixture has a substantially fresher and fuller garlic taste than does the natural garlic oil alone. The flavor strengths of the two solutions are considered to be closely similar.

The foregoing test gives rise to the conclusion that allyl thiopropionate is very useful in reconstituting imitation garlic oils and adding fresher garlic notes to other garlic products.

EXAMPLE IV

The following mixture is prepared:

| Ingredient | Parts |
|---|---|
| Propyl thiopropionate | 20 |
| Natural onion oil | 80 |

The mixture is compared with the pure onion oil at the rate of 0.5 ppm in water. The mixture has fuller and fresher aroma and taste characteristics than the natural onion oil alone. The flavor strength of the mixture as compared to the pure natural onion oil is the same.

The foregoing gives rise to the conclusion that propyl thiopropionate is useful in reconstituting imitation onion oils with onion aroma and taste characteristics.

EXAMPLE V

| Ingredient | Parts |
|---|---|
| Propyl thioacetate | 20 |
| Propyl thiopropionate | 30 |
| Cyclopentyl thiopropionate | 50 |

The above ingredients are thoroughly homogenized at 25° C. The mixture has an excellent onion flavor.

EXAMPLE VI

Three meat loaf type products are prepared according to the following formulation:

| Ingredient | Amount |
|---|---|
| TVP, minced* | 1 cup |
| Ground beef | 1 cup |
| Water | 1 cup |
| Beef suet | ⅛ cup |
| Bread crumbs, dry, unflavored | 1 cup |
| Whole milk | 1 cup |
| Egg albumen | 3 tbsp. |
| Salt | 1¼ tbsp. |
| Black pepper | ¼ teasp. |
| Catsup | ¼ cup |
| Water | 32 ml. |

*"TVP" is a texturized vegetable protein mixture made by Archer-Daniels-Midland Company.

Three separate portions prepared according to the foregoing formulation are made into three meat loaves. Loaf A contains no additional additive. Loaf B contains 32 ml. of fresh pressed onion juice to replace the 32 ml. of water, and Loaf C contains 5 ppm of the mixture prepared in Example V. The three loaves are baked at 350° F. for 1 hour.

The Loaves B and C are judged superior to Loaf A because the onion character of B and C enhances the overall taste and covers the dry, cardboard-like cereal character of Loaf A.

EXAMPLE VII

Tobacco Flavor Containing Methyl Thiobenzoate

The following mixture is prepared:

| Ingredient | Parts |
|---|---|
| Methyl thiobenzoate | 10 |
| Tobacco absolute* | 450 |
| Caproic acid | 20 |
| Geraniol | 20 |
| Absolute ethanol | 500 |

*Tobacco absolute is a commercially available product prepared by Adrien & Co., 15 Rue de Cassis, Marseilles, France.

The foregoing solution is applied to an aged, cured, and shredded domestic Burley tobacco in an amount to provide tobacco compositions containing ¼, ½, and ¾ percent, respectively, of the mixture on a dry basis. Thereafter, the alcohol barrier is removed by evaporation, and the tobacco is manufactured into cigarettes by conventional means.

The tobaccos treated as indicated have a desired and pleasing "perique" aroma which is detectable in the main and side smoke streams when the cigarette is smoked.

EXAMPLE VIII

Use of Ethyl Thioacetate for Synthetic Meat Flavor

The following mixture (A) is prepared:

| Ingredient | Parts |
|---|---|
| L-cysteine hydrochloride | 1.71 |
| Carbohydrate-free vegetable protein hydrolysate | 28.63 |
| Thiamine hydrochloride | 1.71 |
| Water | 67.95 |

This mixture is refluxed for 4 hours and aged for 3 days to produce reaction product "B".

The following mixture is then produced:

| Ingredient | Parts |
|---|---|
| Sodium chloride | 30 |
| Monosodium glutamate | 20 |
| Maltodextrin | 30 |
| Levulinic acid | 1 |
| Reaction product "B" | 18 |
| Ethyl thioacetate | 1 |

The resulting product has an intense roasted meat flavor, the "roasted" note being augmented by means of the addition of the ethyl thioacetate.

EXAMPLE IX

A beef gravy is made by formulating a gravy flavor composition of the following ingredients in the amounts indicated.

| Ingredient | Gms./unit |
|---|---|
| Cornstarch | 10.50 |
| The product of Example VIII | 3.00 |
| Carmel color | .30 |
| Garlic powder | .05 |
| White pepper | .05 |
| Salt | 1.92 |
| Monosodium glutamate | .20 |

To one unit of gravy flavor concentrate, 8 ounces of water are added, and the mixture is stirred thoroughly to disperse the ingredients, brought to a boil, simmered for 1 minute, and served. This "meatless" gravy exhibits excellent beef flavor.

EXAMPLE X

Tobacco Flavor Mixture Containing Propyl Thiopropionate

The following mixture is prepared:

| Ingredient | Parts |
|---|---|
| Propyl thiopropionate | 10 |
| Tobacco absolute* | 450 |
| Caproic acid | 20 |
| Genaniol | 20 |
| Absolute ethyl alcohol | 500 |

*Tobacco absolute as in Example VII.

The foregoing solution is spread onto shredded and blended domestic tobacco to produce a 0.005 percent level of propyl thiopropionate on the tobacco. After the ethyl alcohol is evaporated from the treated tobacco, cigarettes are made having a standard cellulose acetate filter.

A second quantity of shredded and blended domestic tobacco is spread with the same relative quantity of ethyl alcohol and with all the ingredients of the above mixture, but the propyl thiopropionate is omitted. After the ethyl alcohol is evaporated from the tobacco, cigarettes are made having a standard cellulose acetate filter. This second group of cigarettes is used as the control for testing purposes.

Both the propyl thiopropionate-treated cigarettes and the control cigarettes are smoked by experts. The result of the expert tests demonstrates a preference for the propyl thiopropionate over the control cigarettes.

EXAMPLE XI

A 0.9 cc portion of a 0.1 percent solution of allyl thiobenzoate in propylene glycol is added to 7.3 gms of a soup basis consisting of

| Ingredient | Quantity |
|---|---|
| Fine ground sodium chloride | 35.62 |
| Hydrolyzed vegetable protein | 27.40 |
| Monosodium glutamate | 17.81 |
| Sucrose | 10.96 |
| Beef fat | 5.48 |
| Sethness caramel color | 2.73 |

The resulting mixture is added to 12 ozs. of boiling water to create a soup having an excellent garlic-salami flavor.

EXAMPLE XII

The following ingredients are refluxed for four hours, aged for three days, and spray-dried to produce a solid product having a beef flavor. Before drying, sufficient gum arabic is added to provide a composition containing 0.5 part gum arabic and one part flavor solids.

| Ingredient | Parts |
|---|---|
| L-Cystein hydrochloride | 1.32 |
| Carbohydrate-free vegetable protein hydorlysate | 22.05 |
| Ethyl thioacetate | 22.00 |
| Thiamine hydrochloride | 1.32 |
| beta-Alanine | .50 |
| Water | 53.31 |

A similar reaction product without the ethyl thioacetate in the reactants does not have as characteristic a meaty note as does the product with the ethyl thioacetate.

Food flavors are similarly enhanced and improved utilizing methyl thiopropionate, methyl thioacetate, propyl thiobenzoate, methyl 3-(methylthio)propionate, and like substances and combinations thereof according to the present invention.

It will be appreciated from the foregoing description that methyl thiobenzoate is particularly suited to the production of tobacco (which term is also taken herein to include tobacco products such as cigarettes and cigarette tobacco, cigars and cigar tobacco, pipe tobacco, snuff, chewing tobacco, and the like) to provide interesting and novel flavors of the perique type. Such use of methyl thiobenzoate and compositions suitable for carrying out such use are also contemplated within the present disclosure.

What is claimed is:

[1. A process for altering the flavor of a foodstuff which comprises adding thereto a small flavor-altering amount of at least one thioester having the formula:

$$[\ R_1-S-\overset{\overset{\displaystyle O}{\|}}{C}-R_2]$$

wherein R is alkyl, aryl, aralkyl, alkaryl, cycloalkyl or alkenyl and $R_2$ is alkylthioalkyl, aralkyl, alkaryl or aryl, $R_1$ containing at least two carbon atoms when $R_2$ is phenyl or an alkyl group containing three to four carbon atoms.]

[2. A process according to claim 1 wherein $R_1$ contains from one to ten carbon atoms.]

[3. A process according to claim 1 wherein $R_2$ is alkyl containing from one to ten carbon atoms or an alkylthioalkyl group containing from 2 to 6 carbon atoms or phenyl or phenylmethyl or phenylethyl aralkyl group.]

[4. A process according to claim 1 wherein the consumable material contains from about 0.005 to about 40 ppm of thioester.]

[5. A process as claimed in claim 1 wherein said thioester is ethyl thioacetate.]

[6. A process as defined in claim 1 wherein said thioester is allyl thiopropionate.]

[7. A process as defined in claim 1 wherein said thioester is propyl thioacetate.]

[8. A food flavor-altering composition which contains as an essential ingredient from about 0.1 to 90 percent by weight of the total composition of at least one thioester according to the formula:

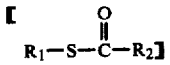

wherein $R_1$ is alkyl, aryl, aralkyl, alkaryl, cycloalkyl or alkenyl and $R_2$ is alkyl, alkylthioalkyl, aralkyl or alkaryl, $R_1$ containing at least two carbon atoms when $R_2$ is phenyl or an alkyl group containing three to four carbon atoms, and another flavoring agent selected from the group consisting of 2-methoxy-3-isobutyl pyrazine, 2-isobutylthiazole, dipropyl disulfide, dialkyl disulfide, propyl propenyl disulfide and mixtures thereof.]

*9. A process for augmenting or enhancing the flavor of a foodstuff which comprises adding thereto from about 0.005 ppm up to about 40 ppm of a thioester selected from the group consisting of allylthiobenzoate, propylthiobenzoate, methyl-3-(methylthio) thiopropionate, propylthiopropionate, allylthiopropionate, and cyclopentylthiopropionate.*

*10. The process of claim 9 wherein the thioester is allylthiobenzoate.*

*11. The process of claim 9 wherein the thioester is propylthiobenzoate.*

*12. The process of claim 9 wherein the thioester is methyl-3-(methylthio) thiopropionate.*

*13. The process of claim 9 wherein the thioester is propylthiopropionate.*

*14. The process of claim 9 wherein the thioester allylthiopropionate.*

*15. The process of claim 9 wherein the thioester is cyclopentylthiopropionate.*

* * * * *